March 19, 1974  CHEN-SHEN WANG  3,798,281
PROCESS FOR PRODUCTION OF POLARYLENES
Filed July 31, 1972  2 Sheets-Sheet 1

INVENTOR.
Chen-Shen Wang

BY *Morando Benettin*
ATTORNEY

United States Patent Office 3,798,281
Patented Mar. 19, 1974

3,798,281
PROCESS FOR PRODUCTION OF POLYARYLENES
Chen-Shen Wang, Naperville, Ill., assignor to Standard Oil Company, Chicago, Ill.
Continuation-in-part of abandoned application Ser. No. 169,429, Aug. 5, 1971. This application July 31, 1972, Ser. No. 274,587
Int. Cl. C07c 15/12
U.S. Cl. 260—670    19 Claims

ABSTRACT OF THE DISCLOSURE

An improved rapid process for obtaining polyarylenes, i.e., polymers of aromatic compounds, by contacting aromatic compounds with an $Al_2O_3$-$SiO_2$ catalyst system.

CROSS-REFERENCE

This application is a continuation-in-part of Ser. No. 169,429, filed Aug. 5, 1971 on behalf of the same inventor, and now abandoned.

INTRODUCTION

This invention relates to an improved process for making polyarylenes, in particular to the use of an $Al_2O_3$-$SiO_2$ catalyst system in a process for making branched polyarylenes.

This invention is related to the subject matter disclosed in Wennerberg Ser. No. 858,867, filed Sept. 17, 1969 now abandoned, and copending patent applications Wennerberg Ser. No. 264,846, filed June 21, 1972 as a continuation-in-part of Ser. No. 858,867, and Wang et al., Ser. No. 92,832, filed Nov. 25, 1970, now abandoned.

Over the past decade or so much effort has been extended to the synthesis and evaluation of the thermal stability of aromatic, organo metallic, heterocyclic and inorganic polymers; highly fluorinated polymers; coordination polymers; and pyrolytic polymers to meet the demands of modern technology advances and in particular the increasingly astringent environment requirements of space programs. The goal has been to extend the useful upper temperature limits at which polymers maintain their desirable properties to at least 300° C. with an alternative objective of 500° C. or above. Polymers which show these properties are usually highly aromatic in structure, often with heterocyclic units, high melting, sometimes infusible and usually with low solubility in all solvents. This makes their fabrication very difficult and as a consequence limits their usefulness. There are relatively few polymers which are available commercially as plastics, films, wire-coating polymers, etc. which are stable in the temperature range indicated.

The high degree of thermal stability as associated with the arylene bond in polyarylenes has been known for some time along with the growing need for high temperature stable polymers. The linear polyarylenes produced to date have generally been unworkable as a result of their great insolubility and infusibility. Wennerberg in his patent applications, Ser. No. 858,867, now abandoned and Ser. No. 264,846, has disclosed a process for making polyarylenes which are relatively soluble, fusible and thermally stable.

SUMMARY OF THE INVENTION

This invention relates to an improved economical process for making fusible, soluble, and thermally stable polyarylenes at relatively high conversion rates and at a faster polymerization rate than was attainable heretofore. The improved process comprises the reaction of aromatic compounds with an $Al_2O_3$-$SiO_2$ catalyst system in the presence of hydrogen at elevated temperatures and pressures. In general, the temperature should be at least about 800° F. and the pressure should be at least about 600 p.s.i.g.

The conversion to soluble polyarylenes is at least about 20% as based upon reactable ingredients. The inherent viscosity of the polymer produced by this process is preferably at least about 0.06 as determined in trichlorobenzene at 135° C. This corresponds to a number average molecular weight of about 3000.

DESCRIPTION OF THE INVENTION

Figure 1:
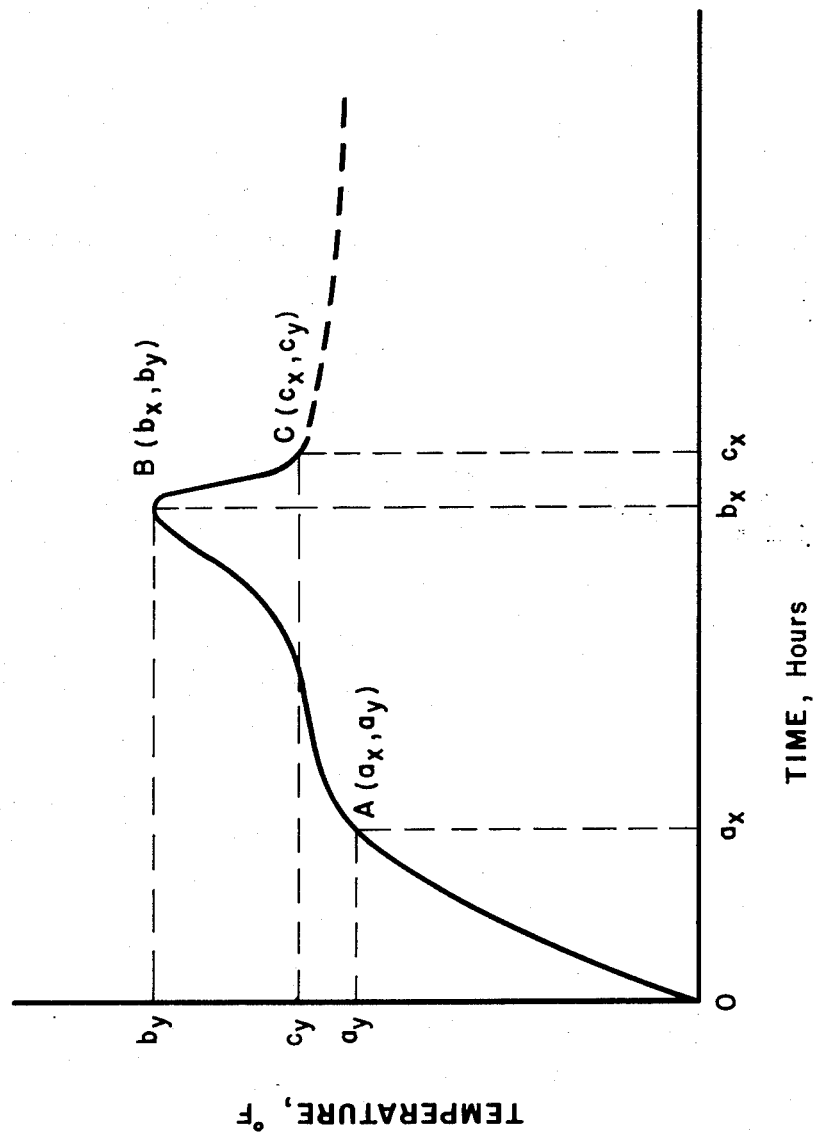
FIG. 1 is a plot generally showing the temperature-time relationship of the reactions taking place in the process of this invention.

This invention is directed to an improved process for making fusible, soluble and thermally stable polyarylenes at relatively high conversions, preferably at least about 20% as based on reactable ingredients, and having relatively high molecular weights, preferably at least about 3000 (number average). This corresponds to an inherent viscosity of about 0.06 as determined in trichlorobenzene at 135° C. Most preferably, however, conversions are in excess of about 30% and the molecular weights are about 4000 to about 10,000 (number average). This molecular weight range corresponds to an inherent viscosity range of about 0.08 to 0.17.

The process of this invention involves the contacting of aromatic compounds with an aluminum-silica catalyst system, hereinafter referred to as $Al_2O_3$-$SiO_2$, in the presence of hydrogen at a temperature of at least about 800° F. and at elevated pressures. In general, the pressure should be at least about 600 p.s.i.g. The hydrogen partial pressure should be at least about 10% of the total pressure at reaction conditions.

These polyarylenes are readily prepared by a one-step process starting with partially hydrogenated aromatics, by a two-step process starting with non-hydrogenated aromatics or a mixture of non-hydrogenated aromatics and partially hydrogenated aromatics, or by a combination of these processes. The one-step process consists of the catalytic dehydrogenative coupling of the partially hydrogenated aromatics in the presence of hydrogen at elevated temperatures and pressures. The two-step process consists of a controlled partial hydrogenation as well as the dehydrogenative coupling. The two-step process begins with either non-hydrogenated aromatic compounds or a mixture of non-hydrogenated aromatic compounds and partially hydrogenated aromatic compounds. Preferably, a mixture of non-hydrogenated aromatics with from about 1% to 10% of partially hydrogenated aromatics is employed. This two-step process of controlled hydrogenation and dehydrogenative coupling can be run as two separate steps or is preferably combined into one process during which the controlled hydrogenation and the dehydrogenative coupling can be occurring simultaneously.

The polyarylenes produced by the process of this invention are compositions which retain a high degree of thermal stability while possessing solubility in various aromatic solvents. The polyarylenes can be dissolved to different extents, depending on their molecular weight and structure, in solvents such as benzene, naphthalene, bromobenzene, and chlorobenzene. As the molecular weight of the polyarylenes increases, the halogenated aromatics are the preferred solvents. Polar compounds such as tetrahydrofuran and dimethylformamide can also be used as solvents. In general, the product polyarylenes are soluble over their full molecular weight range. These polymers also exhibit excellent thermo-oxidative stability up to 600° C. in air and 1000° C. in nitrogen.

These polyarylenes are particularly useful in applications requiring high-temperature resistance. Among the applications for this polymer are use in carbon fiber composites and in ablative materials.

In a preferred embodiment of this invention the $Al_2O_3$-$SiO_2$ system is used as a support for other active ingredients incorporated into the catalyst system. These other active ingredients are oxides of metals listed in the Mendelyeev Periodic Table in Groups V–B, VI–B, VII–B, VIII–B periods 4 and 5, III–A and IV–A periods 2 and 3, and combinations thereof. Most preferably such additional active ingredients are alkalized chromium trioxide, ferric oxide, calcium oxide, cobalt oxide and molybdenum oxide alone or in combination. When used in combination with such other active ingredients, the $Al_2O_3$-$SiO_2$ content is preferably about at least 90% by weight and most preferably about 95 to about 98 weight percent as based on the total weight of the catalyst combination.

While the Wennerberg process is a remarkable and an outstanding breakthrough in the production of polyarylenes having properties of solubility, fusibility, thermal stability, and relatively high molecular weights, it has been discovered that this process may be further improved in terms of accelerating reaction times, by as much as 500% or more, while maintaining the desired listed properties by using the $Al_2O_3$-$SiO_2$ catalyst system.

As is typical of the reaction systems of this invention, the amount of $SiO_2$ in the catalyst system employed in order to achieve the objects of this invention will vary with the particular reaction system being polymerized. Further, care must be taken in employing the proper amount of the $SiO_2$ and $Al_2O_3$ ingredients. For example, if the $SiO_2$ content of the catalyst is too high the rate will be very fast, the molecular weight will be high but the conversion to the final product will tend to be low. Also formation of coke is likely. On the other hand, if an inadequate amount of $SiO_2$ is used as part of the catalyst system, the conversion may be high but the reaction rate will be very low. However, generally the $Al_2O_3/SiO_2$ ratio, on a weight basis, is at least about 1/9 and preferably about 1/7 to about 1/5.

With regard to the surface area of the cataylst system, similar problems to those arising under proper selection of $SiO_2$ content arise. Namely, if the surface area is too high rapid reaction rates will accompany low conversion levels and low molecular weights, whereas if surface area is too low good conversion levels will accompany poor reaction rates. Typically, however, catalyst system surface areas are at least about 250 m.$^2$/g. and preferably about 300 to about 450 m.$^2$/g.

The $SiO_2$-$Al_2O_3$ ingredient of the catalyst system is commercially available and may be purchased for example from Nalco Chemical Company, Chicago, Ill.

When other ingredients are used, the catalyst of this invention may be prepared by impregnating the pores of the $SiO_2$-$Al_2O_3$ support with the remaining component(s) of the catalyst system referred to herein as the active ingredient(s). This may be accomplished by putting the active ingredients into a solution at a desired concentration. This solution is then added to the $SiO_2$-$Al_2O_3$ material with mixing. Preferably enough solution is added to completely fill the total pore volume of the $SiO_2$-$Al_2O_3$ material. After mixing, the impregnated $SiO_2$-$Al_2O_3$ material is heated slowly, at about 80–100° C., for 24–48 hours to remove the water so as not to effect the catalyst and ensure even distribution of the active material. After removal of the water, the catalyst system is calcined at temperatures of about 700–850° C. for periods of about 4–24 hours.

The amount of catalyst necessary to effectively be utilized in the process of this invention will vary with the reaction system being polymerized and the reaction conditions on terms of time, temperature and pressure. If an insufficient amount of catalyst is used for a particular reaction system under any set of reaction conditions, reaction rates will be decreased. If excess catalyst is used, conversion will be decreased and coke formation will occur. For most reaction systems, at least about 1% by weight catalyst, based on the monomer weight, is used and preferably about 2 to about 4% by weight.

Aromatic compounds which are polymerized in the process of this invention are defined to be any compound containing an aromatic ring structure which is either substituted or non-substituted. If it is substituted, however, the substituted aromatic compounds cannot have groups which are too large and preferably such compounds are mono-, di- and tri-substituted benzene ring compounds wherein the substituents are alkyl groups containing 1 to 3 carbon atoms.

Included within the class of aromatic compounds are partially hydrogenated aromatic compounds as distinguished from non-hydrogenated aromatic compounds which are also in the class. Such partially hydrogenated aromatic compounds must be hydrogenated to at least their dihydro derivative but must not be fully hydrogenated. The non-hydrogenated aromatic compounds and the partially hydrogenated aromatic compounds may be reacted alone or in combination although preferably the non-hydrogenated aromatic compounds are reacted in the presence of at least about 1% to 10%, preferably about 2% to about 5%, by weight of the partially hydrogenated compounds as based on their total combined weight.

Specific examples of non-hydrogenated aromatic compounds which can be polymerized by the process of this invention are compounds that have an aromatic ring structure such as phenyl, biphenyl, toluene, xylenes, ethylbenzene, naphthalene, mesitylene, anthracene and the like.

Examples of partially hydrogenated aromatic compounds which can be utilized in the process of this invention are the hydrophenyls such as cyclohexadiene and cyclohexene, the hydrobiphenyls such as phenyl cyclohexadiene, phenyl cyclohexene, and phenyl cyclohexane, the hydrotoluenes, the hydroxylenes, the hydronaphthalenes, the hydroanthracenes, and the like.

All of the aromatic compounds which are polymerized in the process of this invention must have at least two unsubstituted positions for coupling reactions.

The polymerization must be conducted in the presence of hydrogen. The hydrogen partial pressure should be at least about 10% of the total pressure at reaction conditions. Preferably the hydrogen partial pressure is from about 30% to 60% of the total reaction pressure at reaction conditions. More preferably, the partial hydrogen pressure is about half of the total pressure. In general, if the process of this invention is carried out in an autoclave reactor, the initial charge of hydrogen gas at room temperature should be at least about 50 p.s.i.g. and preferably between about 200 p.s.i.g. and 400 p.s.i.g.

The presence of an inert solvent is not necessary. However, with some monomers it may be desirable to conduct the polymerization reaction in a hydrocarbon solvent which tends to remain relatively inert under the conditions of the reaction.

Specific time, pressure and temperature conditions for the process of this invention cannot be given since such will depend upon the nature of the particular aromatic compound being polymerized as well as the particular catalyst system being employed. For example, condensed ring compounds such as naphthalene are in general more reactive than single ring compounds such as biphenyl and the reactions may be carried out under milder conditions with the former.

However, time and temperature conditions for a batch process beginning with non-hydrogenated aromatics or a mixture of non-hydrogenated and partially-hydrogenated aromatics can be taught generally by referring to reaction temperature—reaction time relationships for any particular reacting system being subjected to a constant heat input.

It is thought that the polyarylenes produced by the process of this invention are produced by dehydrogenative coupling of partially hydrogenated aromatic compounds. Therefore, if partially hydrogenated aromatic compounds are not initially used as monomer reactants, the polymerization cannot effectively take place until the aromatic compounds used as monomer reactants are partially hydrogenated so that they can subsequently be dehydrogenated as part of the polymerization process. Hydrogenation must produce at least dihydro derivatives but must not result in complete hydrogenation.

The partial hydrogenation of the aromatic compounds in the process of this invention is exothermic; the dehydrogenative coupling of such partially hydrogenated compounds is endothermic. Utilizing these characteristics under conditions of constant heat input to the reaction system, reaction times and temperatures may be generally identified.

In order to illustrate this point, reference is made to FIG. 1 where a general reaction temperature vs. reaction time curve is given for an aromatic compound reaction system having a constant heat input and which is polymerized in accordance with the process of this invention. With the constant heat input, the reaction system is preheated for a period of time $a_x$ to a temperature $a_y$. This preheat period extends up to a point A on the curve. Point A is approximately on that portion of the curve where the slope changes from steep to gradual. After preheat, the reaction system begins to react in substantial proportions in terms of partial hydrogenation with some coupling up to the peak point B having corresponding time and temperature coordinates of $b_x$ and $b_y$. It is from this point that it is thought that the major dehydrogenative coupling occurs to form the polyarylene, although some partial hydrogenation is still most likely occurring. The dehydrogenative coupling is considered for all practical purposes completed at point C where the curve starts to level off. It is therefore at point C with corresponding time and temperature coordinates of $c_x$ and $c_y$ that the reaction is terminated by terminating heat input to the reaction and allowing the reaction system to go to room temperature. Therefore, relative to this general curve, reaction time is considered to be that interval of time between reaction termination and preheat completion or the quantity $(c_x-a_x)$. Reaction temperatures are similarly those temperatures between the peak reaction temperature and preheat completion, i.e., betwen $b_y$ and $a_y$.

As previously stated, the reaction time and reaction temperature correlations for the process of this invention will vary from system to system. However, for a batch process beginning with non-hydrogenated aromatics or a mixture of non-hydrogenated and partially hydrogenated aromatics, typically the heat-up period corresponding to $a_x$ hours on the plot of FIG. 1 will vary from about 0.5 to about 2 hours. Similarly, the heat-up temperatures corresponding to $a_y$ on the curve can be from about 800 to about 1000° F. The peak reaction temperatures, $b_y$, corresponding to point B can be about 900 to about 1300° F., preferably 1000° F. to 1200° F. The reaction temperature, $c_y$, at which the reaction is terminated is about 800 to about 1000° F. Therefore, the overall reaction temperature interval of $b_y$ to $a_y$ can have reaction temperatures varying from about 800° F. to about 1300° F. The reaction time, i.e., the period of time between $a_x$ and $c_x$ is about 2 to about 9 hours.

The pressures reached after the initial heat up are generally within the range of 600 p.s.i.g. to 1200 p.s.i.g., although higher pressures are possible. The maximum pressure is generally within the range of 1000 p.s.i.g. to 2000 p.s.i.g., preferably 1200 p.s.i.g. to 1700 p.s.i.g.

Figure 2:
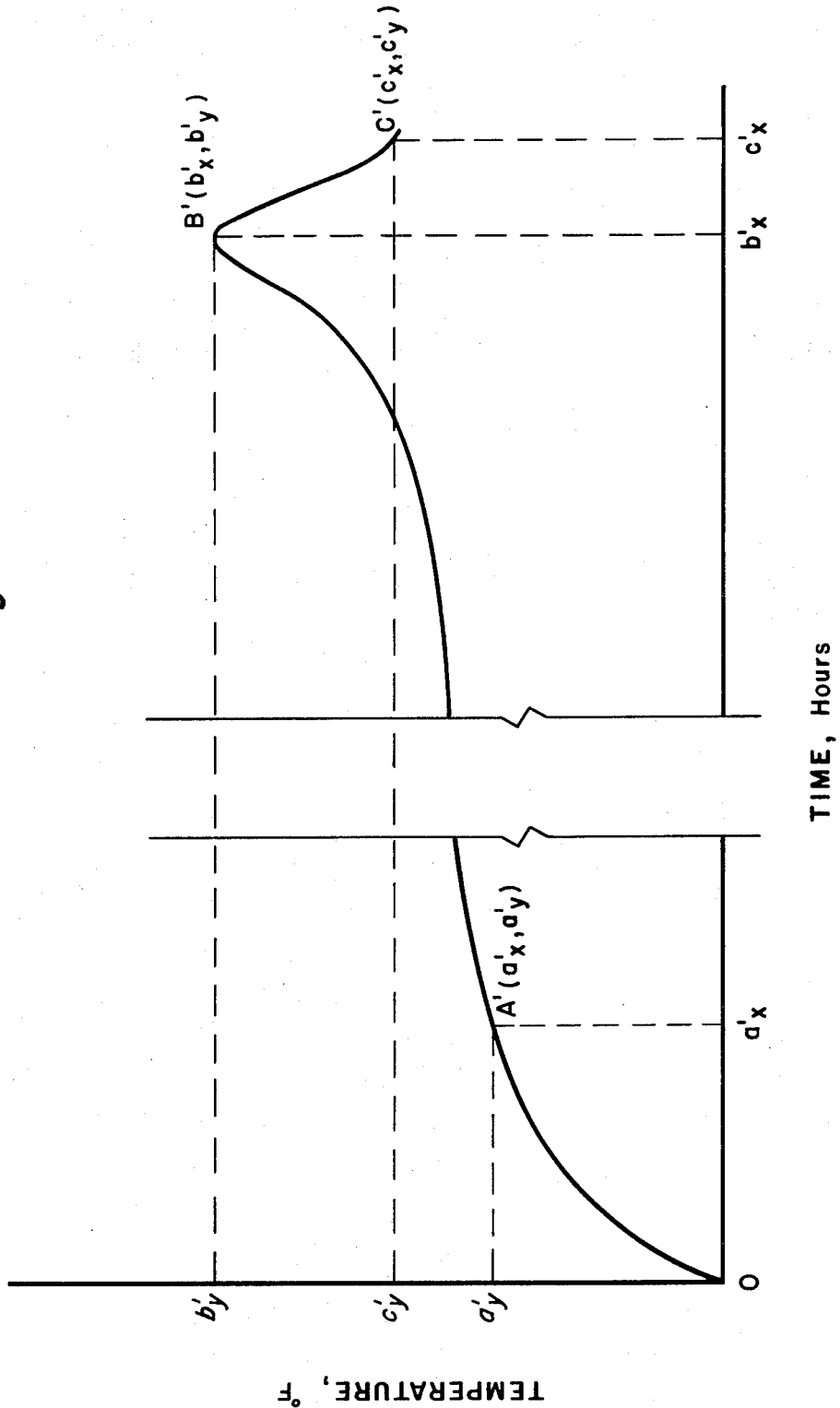
FIG. 2 is a plot generally showing the temperature-time relationship of reactions similar to those of the process of this invention but in the absence of $SiO_2$.

For purposes of illustration, FIG. 2 is given as a typical reaction temperature vs. reaction time curve for a reaction system such as $CoO \cdot MoO_3$ supported on $Al_2O_3$ in the absence of $SiO_2$. In such a reaction system, the heat-up period $a'_x$ remains about the same as $a_x$ for the $SiO_2$ containing system. However, the reaction time $(c'_x-a'_x)$ is many times longer and normally in excess of 500% of the reaction time $(c_x-b_x)$ for the reaction system where $SiO_2$ is part of the catalyst system. Such remains true despite the otherwise equivalent reaction conditions, i.e., $a_y=a'_y$, $c_y=c'_y$ and $b_y=b'_y$. Hence the effect of this $SiO_2$ is critical to the rapid polymerization rate in the process of this invention.

We have also ascertained advantageous reaction conditions for the one-step process beginning with partially hydrogenated aromatics and for the two-step process beginning with non-hydrogenated aromatics or a mixture of non-hydrogenated aromatics and partially hydrogenated aromatics.

In a one-step process starting with the partially hydrogenated aromatics, temperatures within the range of 800° F. to about 1300° F., preferably about 900° F. to 1200° F., and pressures within the range of 600 p.s.i.g. to 2000 p.s.i.g., preferably 1000 p.s.i.g. to 1700 p.s.i.g., more preferably 1200 p.s.i.g. to 1600 p.s.i.g., have been found useful.

In a two-step process starting with the aromatics or a mixture of aromatics and partially hydrogenated aromatics, we have found that temperatures within the range of 400° F. to 1200° F., preferably 800° F. to 1100° F., and pressures within the range of 500 p.s.i.g. to 2000 p.s.i.g., preferably 800 p.s.i.g. to 1500 p.s.i.g., are useful in the hydrogenation step. In the dehydrogenation step, we have found temperatures within the range of 800° F. to 1300° F., preferably 900° F. to 1200° F., and pressures within the range of 600 p.s.i.g. to 2000 p.s.i.g., preferably 1000 p.s.i.g. to 1700 p.s.i.g., to be particularly useful.

While the invention has been described in conjunction with the specific embodiments therefor, it is evident that many alternatives, modifications and variations will be apparent to those skilled in the art in light of the foregoing description. Accordingly, it is intended to embrace all such alternatives, modifications and variations which come within the spirit and scope of the appended claims.

In order to illustrate a typical preparation of a catalyst system useful in this invention which comprises active ingredients and the $SiO_2$-$Al_2O_3$ support, the following is given:

The pore volume of $SiO_2$-$Al_2O_3$ was determined to be 0.73 ml. per gram by a titration technique. A 470 ml. solution containing 15.6 g. $(NH_4)_6Mo_7O_{24} \cdot 4H_2O$ (equivalent to 13.5 g. $MoO_3$) and 13.6 g. of $Co(NO_3)_2 \cdot 6H_2O$ (equivalent to 3.5 g. CoO) was prepared. Three and sixty-five hundredths (3.65) ml. of this solution was added to 5 g. of $SiO_2$-$Al_2O_3$. The combination was mixed. The catalyst was then heated to 100° C. and maintained at that temperature for 24 hours to remove all the water. The catalyst was then calcined at 750° C. for 24 hours.

Experiments 1–9

In order to illustrate the produced increase in polymerizing rate as a result of combining $SiO_2$ into the $Al_2O_3$ base, experiments were conducted wherein the process of this invention was operated with and without $SiO_2$ in the catalyst system. The procedure used is as follows:

Into a stirred 300 ml. autoclave there was charged 2.0 g. of the catalyst described in Table I, 97.5 g. of biphenyl, 2.5 g. of phenyl cyclohexane and 300 p.s.i.g. of hydrogen gas. Constant heat input conditions were applied. Unless indicated in Table I, the reaction proceeded according to the reaction scheme indicated in the figures and described in the specification above. After the polymerization was concluded, the total crude product was transferred to a 1000 ml. beaker and dissolved in 500 ml. of 1,2,4-trichlorobenzene with the help of heat and stirring. After filtration to remove the catalyst, the filtrate was transferred into a 4000 ml. flask and the polymer was precipitated out with n-pentane. The polymer was filtered and washed with n-pentane. The polymer was then dried in a vacuum oven at 100° C. for 24 hours. The conversion to polymer soluble in trichlorobenzene and the polymer molecular weight are indicated in Table I. The number average molecular weights indicated in the table are based on the inherent viscosities obtained from the polymer samples measured in trichlorobenzene at 135° C.

Experiments 1 and 2 are indicative of the results that can be obtained with catalyst systems that do not contain both $Al_2O_3$ and $SiO_3$; relatively high conversions and molecular weights can be obtained, but very long reaction times are necessary to achieve these results. Experiment 3 indicates that when $SiO_2$ is incorporated into essentially the same catalyst, the relatively high conversions and molecular weights can still be obtained but with significantly shorter reaction times.

Experiments 4 through 7 further illustrate the excellent conversions and relatively high molecular weights that can be achieved along with the short reaction times when the catalyst system of this invention is utilized.

Experiments 8 and 9 indicate that short reaction times and low molecular weight polymers result when either $SiO_2$ or $Al_2O_3$ is used alone as a catalyst under the process conditions described in the specification. A comparison between Experiments 7 and 8 again indicates the advantages that can be achieved when a $Al_2O_3$-$SiO_2$ catalyst is used according to the process of this invention.

TABLE I

| Experiment | Wt. of each catalyst component | | | | | Reaction time (hrs.) | Percent conversion | M.W. (number average) |
|---|---|---|---|---|---|---|---|---|
| | $Na_2O$ | $CoO_3$ | $MoO_3$ | $SiO_2$ | $Al_2O_3$ | | | |
| 1[1] | 0.007 | 0.035 | 0.13 | 0 | 0.834 | 56.0 | 44.0 | 9,650 |
| 2 | 0.014 | 0.070 | 0.26 | 0 | 1.67 | 73.25 | 45.0 | 6,000 |
| 3 | 0.014 | 0.011 | 0.04 | 1.70 | 0.25 | 9.75 | 37.0 | 5,000 |
| 4 | 0.014 | 0 | 0.04 | 1.70 | 0.25 | 4.25 | 34.6 | 5,000 |
| 5 | 0.014 | 0 | 0.04 | 1.70 | 0.25 | 4.80 | 45.5 | 8,000 |
| 6 | 0.014 | 0.011 | 0.04 | 1.70 | 0.25 | 4.34 | 37.9 | 6,000 |
| 7 | 0.002 | 0 | 0 | 1.74 | 0.26 | 7.00 | 38.0 | 3,000 |
| 8 | 0.002 | 0 | 0 | 1.99 | 0 | [2]7.00 | 25.0 | 1,000 |
| 9 | 0 | 0 | 0 | 0 | 1.97 | [2]7.00 | 18.0 | 1,000 |

[1] 1 g. catalyst used. [2] No exo-endothermic peaks were observed.

What I claim is:

1. A process for the preparation of fusible, soluble, and thermally stable high molecular weight polyarylenes at conversion levels of at least about 20% which comprises treating an aromatic hydrocarbon with an $Al_2O_3$-$SiO_2$ catalyst, in the presence of hydrogen and at a temperature of at least 800° F.

2. The process of claim 1 wherein the temperature is between 800° F. and 1300° F. and the pressure is between 600 p.s.i.g. and 2000 p.s.i.g.

3. The process of claim 1 wherein the aromatic hydrocarbon is a partially hydrogenated aromatic hydrocarbon.

4. The process of claim 3 wherein the partially hydrogenated aromatic hydrocarbon is a member of the group consisting of a partially hydrogenated benzene, a partially hydrogenated biphenyl, a partially hydrogenated toluene, a partially hydrogenated naphthalene, and alkylated hydrocarbon derivatives thereof.

5. The process of claim 1 wherein aromatic hydrocarbon is a non-hydrogenated aromatic hydrocarbon.

6. The process of claim 5 wherein the non-hydrogenated aromatic hydrocarbon is selected from the group consisting of benzene, biphenyl, toluene, xylene, ethylbenzene, and naphthalene.

7. The process of claim 5 wherein the non-hydrogenated aromatic hydrocarbon is biphenyl.

8. The process of claim 1 wherein the aromatic hydrocarbon is a mixture of a non-hydrogenated aromatic hydrocarbon and a partially hydrogenated aromatic hydrocarbon.

9. The process of claim 8 wherein the non-hydrogenated aromatic hydrocarbon is selected from the group consisting of benzene, biphenyl, toluene, xylene, ethylbenzene, and naphthalene, and the partially hydrogenated aromatic hydrocarbon is selected from the group consisting of a partially hydrogenated benzene, a partially hydrogenated biphenyl, a partially hydrogenated toluene, a partially hydrogenated xylene, a partially hydrogenated ethylbenzene, and a partially hydrogenated naphthalene.

10. The process of claim 8 wherein the non-hydrogenated aromatic hydrocarbon is biphenyl and the partially hydrogenated aromatic hydrocarbon is phenyl cyclohexane.

11. The process of claim 8 wherein the partially hydrogenated aromatic hydrocarbon is from 2% to 5% of the total weight of reactants.

12. The process of claim 1 wherein the $Al_2O_3/SiO_2$ weight ratio is at least about 1/9.

13. The process of claim 12 wherein the $Al_2O_3/SiO_2$ weight ratio is about 1/7 to about 1/5.

14. The process of claim 12 wherein the surface area of the $Al_2O_3$-$SiO_2$ catalyst is at least about 250 m.$^2$/g.

15. The process of claim 1 wherein the $Al_2O_3$-$SiO_2$ catalyst system is used as a support for other active ingredients incorporated into the catalyst system, such active ingredients being selected from the group consisting essentially of oxides of metals in Groups V–B, VI–B, VII–B, VIII–B periods 4 and 5, III–A and IV–A periods 2 and 3, and combinations thereof.

16. The process of claim 15 wherein the $Al_2O_3$-$SiO_2$ content of the catalyst system constitutes at least about 90 weight percent.

17. The process of claim 15 wherein the other active ingredients incorporated into the catalyst system are selected from the group consisting essentially of alkalized chromium trioxide, ferric oxide, calcium oxide, cobalt oxide, molybdenum oxide and combinations thereof.

18. The process of claim 15 wherein the $Al_2O_3$-$SiO_2$ content of the catalyst system is about 95 to about 98 weight percent.

19. The process of claim 1 wherein the partial hydrogen pressure under reaction conditions is at least 30% of the total reaction pressure.

References Cited
UNITED STATES PATENTS

| 1,996,738 | 4/1935 | Drossbach et al. | 260—670 |
| 1,996,739 | 4/1935 | Drossbach et al. | 260—670 |
| 3,228,994 | 1/1966 | Robinson | 260—670 |
| 3,359,340 | 12/1967 | Hand | 260—670 |
| 3,367,986 | 2/1968 | De Vries | 260—670 |
| 3,642,926 | 2/1972 | Chapman et al. | 260—670 |

CURTIS R. DAVIS, Primary Examiner

U.S. Cl. X.R.

260—668 R, 668 D

UNITED STATES PATENT OFFICE
CERTIFICATE OF CORRECTION

Patent No. 3,798,281           Dated   March 19, 1974

Inventor(s)   Chen-Shen Wang

It is certified that error appears in the above-identified patent and that said Letters Patent are hereby corrected as shown below:

Col. 7, Table I, M.W. (Number average) column:

"9.650" should be -- 9650 --
"6.000" should be -- 6000 --
"5.000" should be -- 5000 --
"5.000" should be -- 5000 --
"8.000" should be -- 8000 --
"6.000" should be -- 6000 --
"3.000" should be -- 3000 --
"1.000" should be -- 1000 --
"1.000" should be -- 1000 --

Signed and sealed this 16th day of July 1974.

(SEAL)
Attest:

McCOY M. GIBSON, JR.            C. MARSHALL DANN
Attesting Officer               Commissioner of Patents